R. O. PIERCE.
NUT LOCK.
APPLICATION FILED JULY 10, 1917.
1,261,609.
Patented Apr. 2, 1918.
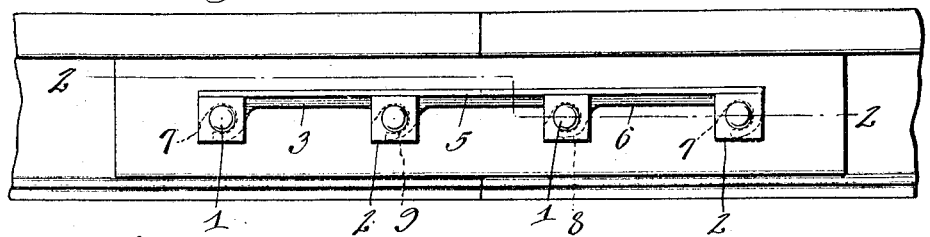
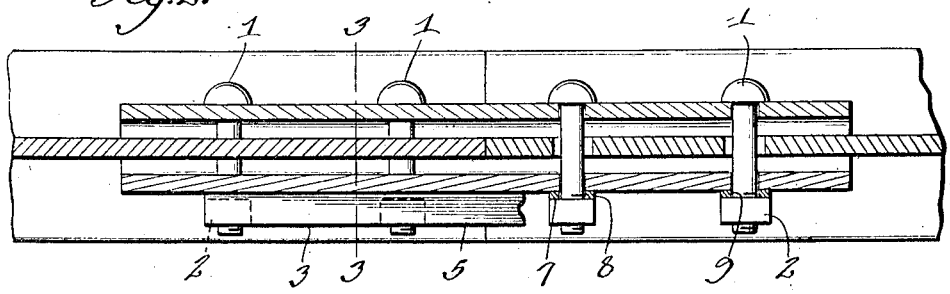
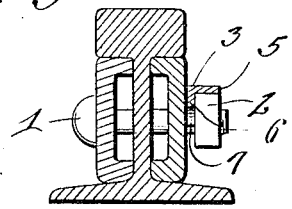
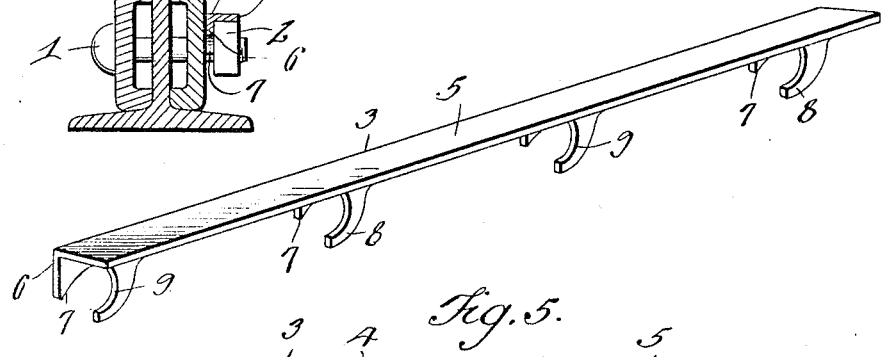
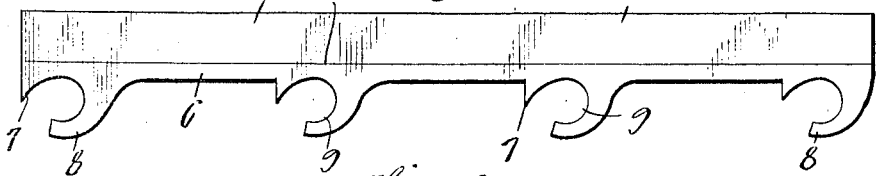
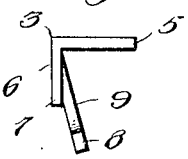
WITNESS
INVENTOR
R. O. Pierce,
BY Victor J. Evans
ATTORNEY

UNITED STATES PATENT OFFICE.

ROSS O. PIERCE, OF MICHIGAN CITY, INDIANA.

NUT-LOCK.

1,261,609.　　　　　　Specification of Letters Patent.　　Patented Apr. 2, 1918.

Application filed July 10, 1917. Serial No. 179,752.

*To all whom it may concern:*

Be it known that I, Ross O. Pierce, a citizen of the United States, residing at Michigan City, in the county of Laporte and State of Indiana, have invented new and useful Improvements in Nut-Locks, of which the following is a specification.

The present invention relates to means for locking a nut upon a bolt, and is primarily but not necessarily devised for employment in holding the nuts upon the bolts connecting the fish plates of abutting rails against accidental unscrewing.

The object of the invention is to produce a device of this character which is simple, cheap, readily arranged in operative position and which will perform the function for which it is devised with accuracy and certainty.

With the above and other objects in view the improvement resides in the construction, combination and arrangement of parts set forth in the following specification and falling within the scope of the appended claims.

In the drawing:

Figure 1 is a side elevation illustrating the application of the improvement,

Fig. 2 is a sectional view approximately on the line 2—2 of Fig. 1,

Fig. 3 is a transverse sectional view approximately on the line 3—3 of Fig. 2, Fig. 4 is a perspective view of the locking ring when the same is arranged to engage with the nuts or the heads of bolts, and Fig. 5 is a plan view of the locking member before the same is bent upon itself to provide the angular construction illustrated in Fig. 4.

Fig. 6 is an end view of the improvement.

In the application of the improvement as disclosed by the drawing I have shown two rails having abutting ends and having arranged upon their opposite sides connecting plates, bolts 1 having their shanks passing through alining threaded apertures in the plates and in the webs of the rails, and nuts 2 screwed upon the projecting ends of the shanks of the bolts.

My improvement comprises a flat metallic plate 3 that is provided at a suitable distance from one of its edges with a longitudinally extending score line 4, whereby to assist in the ready bending of the plate upon the said score in order to produce an upper angular shelf portion 5 and a vertical or depending portion or body 6. The body 6, at suitable spaced intervals, is provided with depending fingers 7, of any desired length and with depending rounded tongues
8 spaced a suitable distance one from each of the said fingers 7 and having its end directed toward the said fingers. The edge of the plate between the inner rounded periphery of the tongues 8 and the fingers 7 is rounded, as indicated by the characters 9, and the outer ends of the rounded tongues 8 are extended outwardly beyond the plane of the body 6 providing spring elements that are designed to frictionally contact with the inner faces of the nuts 2, when the shanks of the bolts are received between the fingers 8 and the tongues 7 and the nuts 2 are screwed home upon the said bolts. It is to be understood that the locking member 3 is arranged upon the bolts before the nuts are screwed home upon the said bolts, and after nuts are thus applied the member 5 is bent angularly upon the score line 4 so as to contact with the edges of all of the nuts, as clearly illustrated by the drawings. The depending fingers 7 prevent the longitudinal movement of the locking member in one direction, the tongues 8 preventing the longitudinal movement of the said member in an opposite direction, and the ends of the said tongues are all arranged in the same direction; that is, toward the left hand side of the plate comprising the locking device so that the spring ends of the tongues will aid in retarding the movement of the nuts in an unscrewing direction, while of course, the angular member or shelf 5 provides a further means for preventing such turning of the nuts.

Having thus described the invention, what I claim is:

1. A locking device of the class described comprising a flat plate including a body having a bendable portion, said body, at its edge opposite that provided with the bendable portion being formed with spaced outwardly extending fingers and with rounded tongues spaced one from each of said fingers, said tongues having their ends terminating adjacent to the fingers and being arranged angularly in an outward direction with respect to said fingers.

2. In a locking device of the class set forth, a flat body having a longitudinal score line adjacent one of its edges whereby to permit of the metal outward of said score being bent over the body, said body at its opposite edge being provided with spaced outwardly extending fingers and with outwardly extending rounded tongues one arranged adjacent each of said fingers, said fingers having their outer ends terminating adjacent the respective tongues and extended at an angle with respect to the said tongues and to said body, and the edge of the body between said fingers and tongues being rounded to conform with the inner peripheral contour of the tongues.

In testimony whereof I affix my signature.

ROSS O. PIERCE.